US011762985B2

(12) United States Patent
Tormasov et al.

(10) Patent No.: US 11,762,985 B2
(45) Date of Patent: Sep. 19, 2023

(54) SYSTEMS AND METHODS FOR PROTECTING FILES INDIRECTLY RELATED TO USER ACTIVITY

(71) Applicant: Acronis International GmbH, Schaffhausen (CH)

(72) Inventors: Alexander Tormasov, Moscow (RU); Serguei Beloussov, Costa Del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 376 days.

(21) Appl. No.: 16/952,466

(22) Filed: Nov. 19, 2020

(65) Prior Publication Data

US 2021/0216624 A1 Jul. 15, 2021

Related U.S. Application Data

(60) Provisional application No. 62/960,217, filed on Jan. 13, 2020.

(51) Int. Cl.
*G06F 21/54* (2013.01)
*G06F 21/12* (2013.01)
*G06F 21/16* (2013.01)

(52) U.S. Cl.
CPC ............ *G06F 21/54* (2013.01); *G06F 21/121* (2013.01); *G06F 21/16* (2013.01)

(58) Field of Classification Search
CPC ........ G06F 21/54; G06F 21/121; G06F 21/16; G06F 21/64; G06F 21/6218
See application file for complete search history.

(56) References Cited

U.S. PATENT DOCUMENTS

| 2006/0136389 A1* | 6/2006 | Cover ................. G06F 9/44526 |
| 2016/0063243 A1* | 3/2016 | Sridhara ............... H04W 12/12 |
| | | 726/23 |
| 2019/0026474 A1* | 1/2019 | Adam .................... G06F 21/563 |
| 2019/0260836 A1* | 8/2019 | Zahl ...................... H04L 63/101 |

(Continued)

FOREIGN PATENT DOCUMENTS

| JP | H05257669 A | * 10/1993 | ............... G06F 8/65 |
| JP | 2004013903 A | * 1/2004 | ............... G06F 8/65 |
| WO | WO-2010002185 A2 | * 1/2010 | ........ G06F 17/30117 |

*Primary Examiner* — Trong H Nguyen
(74) *Attorney, Agent, or Firm* — ArentFox Schiff LLP; Michael Fainberg

(57) ABSTRACT

Disclosed herein are systems and method for protecting files indirectly related to user activity. In one exemplary aspect, a method may comprise identifying, on a computing device, a file that is directly accessed by a user of the computing device. The method may comprise determining an application that provides access to the file. The method may comprise identifying a plurality of program files that the application utilizes during execution. For each respective program file of the plurality of program files, the method may comprise determining whether the respective program file is required by the application to provide access to the file and in response to determining that the respective program file is required, determining a type of threat that can target the respective program file. The method may further comprise performing a data protection action on the respective program file based on the type of threat.

18 Claims, 3 Drawing Sheets

(56) References Cited

U.S. PATENT DOCUMENTS

2020/0125731 A1\* 4/2020 Benameur .................. G06F 8/63
2020/0401389 A1\* 12/2020 Boulton .................... G06F 8/65
2021/0160272 A1\* 5/2021 Mehandale ......... H04L 63/1416

\* cited by examiner

SYSTEMS AND METHODS FOR PROTECTING FILES INDIRECTLY RELATED TO USER ACTIVITY

CROSS-REFERENCE TO RELATED APPLICATIONS

This application claims the benefit of U.S. Provisional Application No. 62/960,217, filed Jan. 13, 2020, which is herein incorporated by reference.

FIELD OF TECHNOLOGY

The present disclosure relates to the field of data security, and, more specifically, to systems and methods for protecting files indirectly related to user activity.

BACKGROUND

Conventional data protection methods (e.g., backup) tend to focus on user files, which do not provide optimal data protection. Protection may concern not only the user's files directly, but also other files that are not directly related to the user's activity. Users often manually select which files to backup or protect, and indirectly used files may not be known to users. For example, a user may perform backup of a text document, but may not back up a font template that is used in the text document. The font template is an indirect file that is needed to display the font in the text document as intended. Accordingly, if the font template is corrupted, deleted, etc., the text document may not be properly displayed.

One approach to solve this issue is by simply having the user back up all files associated with an application used to access a user file. However, such an approach comes with a heavy cost in terms of storage space, processing power, and network bandwidth (e.g., when uploading files to the cloud). There is thus a need to identify all indirect files that the user would require to access a particular user file. The identification of particular indirect files reduces the costs mentioned above because not all files are being collected.

It should be noted that data protection may not necessarily come down to backup, as it may be necessary to strengthen security settings, tighten control over access to data, etc. Therefore, there is an additional need for a system that determines the best data protection action to perform on an indirect file subsequent to identifying the indirect file.

SUMMARY

To address these needs and shortcomings, the present disclosure describes systems and methods for protecting files indirectly related to user activity. In one exemplary aspect, a method may comprise identifying, on a computing device, a file that is directly accessed by a user of the computing device. The method may comprise determining an application that provides access to the file. The method may comprise identifying a plurality of program files that the application utilizes during execution. For each respective program file of the plurality of program files, the method may comprise determining whether the respective program file is required by the application to provide access to the file and in response to determining that the respective program file is required, determining a type of threat that can target the respective program file. The method may further comprise performing a data protection action on the respective program file based on the type of threat.

In some aspects, a method for determining that the respective program file is required comprises determining that removing the respective program file prevents the application from providing access to the file.

In some aspects, a method for determining that the respective program file is required comprises determining that the respective program file is generated temporarily while the file is accessed and is deleted when the file is no longer being accessed.

In some aspects, a method for determining that the respective program file is required comprises receiving an indication that the respective program file is required from a server that is configured to collect usage information of the application from a plurality of computing devices, wherein the indication is based on a subset of the usage information associated with a group of users with user profiles that correspond to a user profile of the user.

In some aspects, a method for determining that the respective program file is required comprises receiving an indication that the respective program file is required from a machine learning algorithm trained to analyze the plurality of program files and identify program files required for accessing the file.

In some aspects, the method may further comprise determining a likelihood of the respective program file being targeted by the type of threat, and in response to determining that the likelihood is greater than a threshold value, prioritizing the respective program file for the data protection action.

In some aspects, a method for prioritizing the respective program file comprises identifying a different program file that is required by the application to provide access to the file, determining another likelihood of the different program file being targeted by the type of threat, and in response to determining that the another likelihood is less than the threshold value, performing the data protection action on the respective program file before performing the data protection action on the different program file.

In some aspects, a method for determining the application comprises identifying a plurality of candidate applications that can potentially provide access to the file, determining a respective plurality of extensions that are compatible with each candidate application of the plurality of candidate applications, and in response to determining that an extension of the file matches a respective extension of the respective plurality of extensions for a respective candidate application, identifying the respective candidate application as the application that provides access to the file.

In some aspects, a method for identifying the plurality of candidate applications comprises determining a content type of the file, and identifying the plurality of candidate applications in response to determining that each respective candidate application of the plurality of candidate applications is associated with the content type of the file.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for protecting files indirectly related to user activity. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
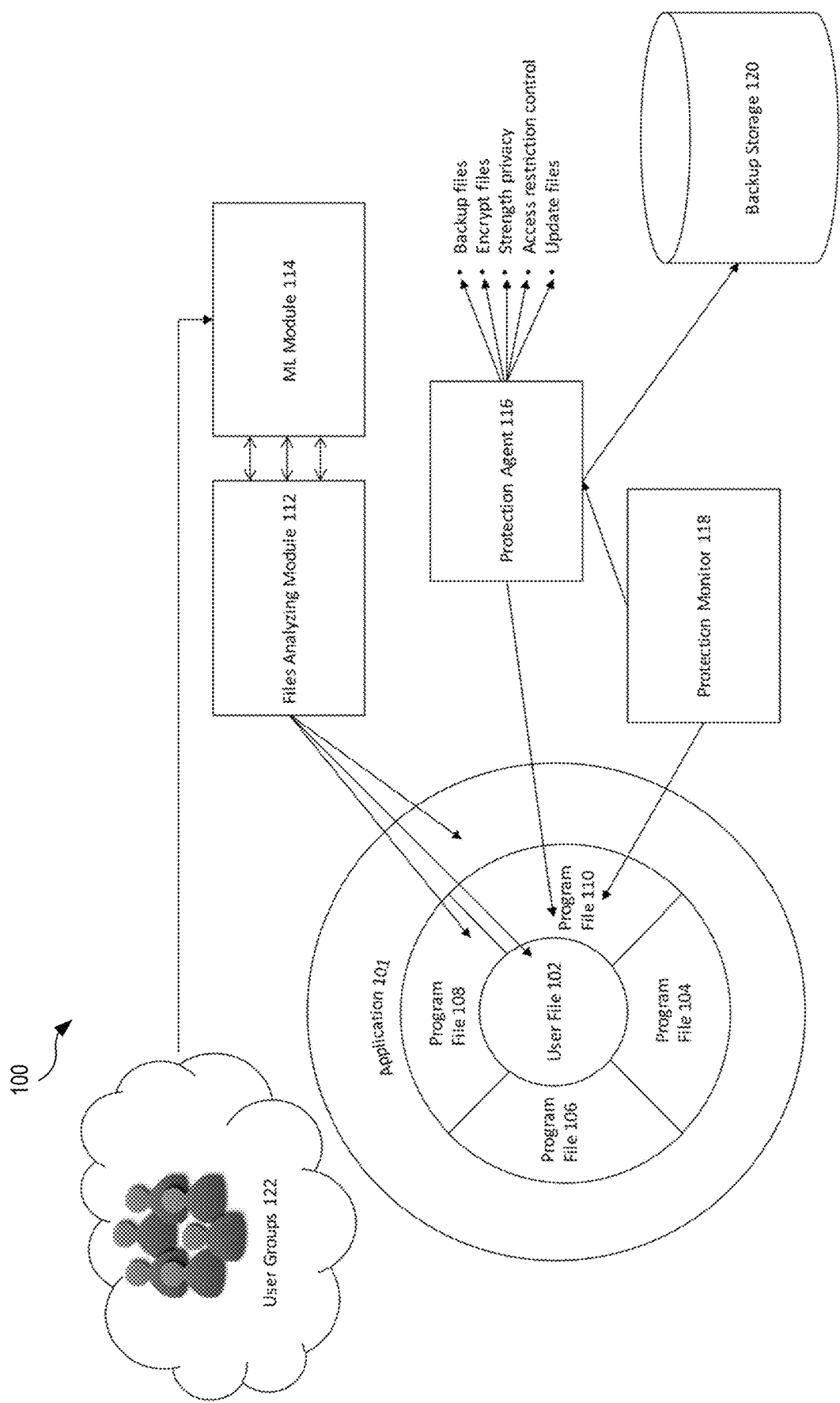
FIG. 1 is a block diagram illustrating a system for protecting files indirectly related to user activity, in accordance with aspects of the present disclosure.

In order to overcome the issues previously discussed, there is a need to identify and protect all files that help facilitate the access to user files that a user directly accesses via an application. FIG. 1 is a block diagram illustrating system 100 for protecting files indirectly related to user activity, in accordance with aspects of the present disclosure. System 100 comprises of application 101, program files 104-110, and user file 102. User file 102 is data that a user has direct access to. Examples of user files may be digital text documents, image files such as photos and drawings, audio files such as music and audio recordings, and video files such as films. Directly accessible files are files that a user typically performs an action on such as creating, modifying, editing, accessing, etc. Indirectly accessible files are files that facilitate the access to a directly accessible file, but are not typically created, modified, edited, or accessed by a user via a direct command. A direct command is a manual selection that may come in the form of a button press (e.g., on a computer via a double-click by a mouse), a voice command (e.g., "play song XYZ on music app" on a smartphone), a gesture (e.g., a swipe on a smartphone), etc. Thus, while a user may manually select a text document and thus the text document is a directly accessible file, a font document may be initiated along with the text document without a direct command and is thus considered an indirectly accessible file.

Indirectly accessible files may be hidden, may work in the background, may be stored in an installation directory, etc. File analyzing module 112 is configured to monitor user behavior/habits, track application capabilities, and identify program files that are indirectly related to user activity. Consider an example in which application 101 is a text editor such as Microsoft Word. User file 102 may be a text document that is opened using Microsoft Word. During typical use, the user may open and edit the text document. In terms of data protection, the user may set privacy settings for the text document in particular or schedule a backup that includes the text document. However, even if the text document is kept secure, there may be a plurality of program files that are used by Microsoft Word to generate the text document for display. For example, program file 104 may be a file with shape templates, program file 106 may comprise add-in functionality (e.g., a tab for visualization features), program file 108 may be a font template (e.g., for font A), and program file 110 may be a different font template (e.g., for font B). File analyzing module 112 may determine that of the four program files, program file 110 (i.e., the font template) is required to access user file 102 because the text document includes text in font B. Program file 110 is not typically directly accessed by the user, but in order to ensure that the user has access to user file 102, program file 110 is required. As a result, a data protection action needs to be applied to program file 110.

From a more technical level, file analyzing module 112 may identify a plurality of files stored on a computing device. In order to detect the indirect files (used interchangeably with indirectly accessible files), file analyzing module 112 first detects directly accessible user files from the plurality of files. For example, file analyzing module 112 may monitor user activity on the computing device to identify the files that the user regularly accesses (i.e., has directly interacted with at least a threshold number of times during a sample period of time). Such files may be frequently used programs, parameters, Internet resources, etc. In some aspects, file analyzing module 112 may generate a list of all files that the user has opened, modified, moved, downloaded, and/or created over a certain time period and identify the files in the list as user files (e.g., user file 102). For example, a particular music file may be downloaded, moved to a directory, and selected for playback. This would be considered as three interactions with the file. If a threshold number of interactions is two, then because the number of interactions is greater than the threshold, the file is considered a directly accessible file (used interchangeably with user file).

In some aspects, file analyzing module 112 detects an instruction by the user to back up a file from the plurality of files. In response to the detection, file analyzing module 112 identifies the file to be backed up as a user file.

Subsequent to identifying user file 102, file analyzing module 112 determines the application that provides access to user file 102. In some aspects, file analyzing module 112 may identify a plurality of candidate applications that can potentially provide access to user file 102. Specifically, file analyzing module 112 may determine a content type of user file 102. For example, the content type of user file 102 may be "text document." Other examples of content types may be "graphics," "audio," "video," "web page," etc. The candidate applications may be stored on computing device and, in this particular example, may be text editors such as Microsoft Word, Notepad++, Visual Studio Code, etc. The plurality of candidate applications are technically identified in response to file analyzing module 112 determining that each respective candidate application of the plurality of candidate applications is associated with the content type of user file 102 (i.e., text editors correspond to text documents). File analyzing module 112 may, for example, refer to a database of content types that maps file content types to potential applications that correspond to the content type.

File analyzing module 112 may then reduce the options of candidate applications by determining a respective plurality of extensions that are compatible with each candidate application of the plurality of candidate applications. For example, Microsoft Word may be able to open files with extensions such as ".doc" and ".docx," while Notepad++ may be able to open files with extensions such as ".cpp". In response to determining that an extension of user file 102 (e.g., ".docx") matches a respective extension of the respective plurality of extensions for a respective candidate application (e.g., Microsoft Word), file analyzing module 112 may identify the respective candidate application as application 101 that provides access to the file.

It may be possible that multiple candidate applications may store the extension of user file 102. In some aspects, responsive to determining that multiple candidate applications support the extension of user file 102, file analyzing module 112 may identify the candidate application with the highest frequency of use by the user as application 101. For example, file analyzing module 112 may monitor user activity and determine the number of times the user accesses a file using a particular application (e.g., the user may open ".txt" files using Microsoft Word 10 times and using Notepad only once). In some aspects, file analyzing module 112 may select all of the candidate applications that support the extension of user file 102 in order to protect all indirect files associated with each candidate application and ensure that user file 102 is accessible on the computing device regardless of the application the user employs to access user file 102. File analyzing module 112 may decide whether to select the most frequently accessed candidate application or all candidate applications based on an amount of resources available on computing device (e.g., whether the amount of available memory and/or processing power can handle all candidate applications) or the amount of storage available on a backup server.

Subsequent to identifying application 101, file analyzing module 112 may determine a plurality of program files that are used by application 101 during its execution (e.g., by referring to the installation directory of application 101 on the computing device). Referring back to the example of Microsoft Word, file analyzing module 112 may search for the installation directory of Microsoft Word and generate a list of files within the folder (i.e., the plurality of program files). File analyzing module 112 may also monitor application 101 during execution of application 101 to identify temporary files that are generated by application 101. These temporary files are also included in the plurality of program files. A program file is any file that facilitates the normal execution of application 101. Program files may include but are not limited to graphics, texts, xml files, executable files, dynamic linkers (e.g., dll), service files, settings files, configuration files, support files for various languages and appropriate computer fonts, etc.

File analyzing module 112 may then analyze each respective program file from the plurality of program files and determine whether the respective program file is required by application 101 to provide access to user file 102. In some aspects, file analyzing module 112 may determine whether the respective program file is required by determining whether the removal of the respective program file prevents application 101 from providing access to user file 102. For example, the plurality of program files may include program file 104, 106, 108 and 110. File analyzing module 112 may temporarily disable, remove, shift a program file from its current location in the installation directory of application 101 and determine whether user file 102 can still be accessed using application 101.

In some aspects, although the respective program file may be required for application 101 to provide access to user file 102, the respective program file may not be required for application 101 to run. In other words, application 101 may function normally without the respective program file.

In some aspects, file analyzing module 112 may determine that the respective program file is required by determining that the respective program file is generated temporarily by application 101 while user file 102 is accessed and is deleted when user file 102 is no longer being accessed. For example, file analyzing module 112 may detect that program file 110 is only present in the installation directory of application 101 when user file 102 is being accessed. Furthermore, if program file 110 (the temporary file) is deleted or removed by file analyzing module 112 during the access of the user file 102 and the access of the user file 102 is broken (e.g., application 101 crashes or user file 102 closes abruptly), file analyzing module 112 may determine that program file 110 is required.

In some aspects, file analyzing module 112 may determine that the respective program file is required by receiving an indication that the respective program file is required from a server that is configured to collect usage information of application 101 from a plurality of computing devices. The indication may be based on a subset of the usage information associated with a group of users (e.g., user groups 122) with user profiles that correspond to a user profile of the user.

In some aspects, file analyzing module 112 may determine that the respective program file is required by receiving an indication that the respective program file is required from a machine learning (ML) algorithm such as ML module 114 trained to analyze the plurality of program files and identify program files required for accessing the file.

In some aspects, ML module 114 may be trained using data provided by user groups 122. For example, ML module 114 may be a classifier that receives an input such as a list of program files and their respective characteristics (e.g., extensions, content information, size, usage statistics, usage purpose, etc.) and output a subset of program files that are required. User groups 122 can make the output of ML module 114 more robust because ML module 114 does not solely need to rely on the usage behavior of the user of application 101. Instead, ML module 114 receives a larger dataset to work with in order to identify required program files (i.e., indirect files needed to facilitate access to user file 102). The larger dataset may account for various versions of application 101, different scenarios in application 101 usage, and computing device configurations. ML module 114 may further analyze user group activity of user group 122. The activity may comprise actions (e.g., creation, modification, access, etc.) of other users on files or file types comparable to or matching user file 102 and state information about the respective computing devices during the actions (e.g., what files were generated by a respective application during the action).

In response to determining that a respective program file (e.g., program file 110) is required, file analyzing module 112 may provide an identifier of the program file to protection monitor 118. Protection monitor 118 is a module that may be configured to determine a type of threat that can target the respective program file. Types of threats include, but are not limited to, destruction or corruption of the program files, theft of personal information, unauthorized access to user data (through service and other files), malware attacks, unauthorized encryption, etc. For example, protection monitor 118 may determine that program file 110 (e.g., a font file for a font used in a text document) is vulnerable to deletion or corruption.

Protection agent 116 may receive information about the type of threat and perform a data protection action on the respective program file based on the type of threat. Examples of data protection actions include, but are not limited to, backing up files to storage, encrypting files, changing file access control settings, and producing any necessary file updates (e.g., installing patches or updating security settings, new malware definitions, etc.). Protection agent 116 may refer to a database that maps types of threats to data protection actions.

For example, protection agent 116 may determine that a program file that is prone to a type of threat such as deletion should be backed up according to the database. Accordingly, protection agent 116 may upload the program file to backup storage 120, which may be a remote server.

As previously mentioned, conventional security systems often rely on simply backing up files rather than performing an appropriate data protection action. Performing an appropriate data protection action is important because performing a backup may not be possible (e.g., the computing device may not have access to backup storage 120 or backup storage 120 may be filled to capacity). In some cases, backing up a file that is prone to getting its access control settings adjusted will not solve the issue (it would make more sense to reconfigure the access control settings of the file and prevent unauthorized access). In some cases, backing up a file that has not been updated (e.g., because a software update has not been run) will not solve potential issues (it would make more sense to trigger a software update). Accordingly, protection agent 116 can take appropriate data protection actions. Files may experience various types of threats including encryption (e.g., by ransomware), deletion, modification (e.g., by a worm), virus implanting, keylogging, theft (e.g., by spyware), corruption, etc. Data protection actions may include backing up (e.g., to combat deletion, encryption, modification, etc.), updating (e.g., to combat spyware, virus implanting, etc.), encrypting (e.g., to combat spyware and keylogging), etc.

In some aspects, protection agent 116 may rely on a predetermined database that maps different program files to types of threats and corresponding data protection actions. An exemplary database may look like:

| User File | Program File | Type of Threat | Data Protective Action |
|---|---|---|---|
| Text Document (doc, txt, docx) | Font file | Deletion | File Backup |
| Email (msg) | OST file | Unauthorized Access | Encryption |
| . . . | . . . | . . . | . . . |

It should be noted that this is a simplified database with two entries, but one skilled in the art would appreciate that any number of entries and details per entry can be included.

In some aspects, protection monitor 118 may determine a likelihood of the respective program file being targeted by the type of threat. For example, protection monitor 118 may determine that a font file of Microsoft Word is required to display a text document and that the font file is prone to deletion. Protection monitor 118 may analyze of dataset (e.g., as provided by user groups 122) to account for the number of times that the particular font file (or, in some aspects, any font file) has been deleted as compared to the number of times that any program file from Microsoft Word has been deleted. In this case, the likelihood is the ratio between the two numbers. In response to determining that the likelihood is greater than a threshold value (e.g., the likelihood is 50% and the threshold value is 40%), protection agent 116 prioritizes the respective program file for the data protection action. For example, file analyzing module 112 may identify a different program file (e.g., an add-on file) that is required by application 101 to provide access to the file. Protection monitor 118 determines another likelihood of the different program file being targeted by the type of threat, and in response to determining that the another likelihood is less than the threshold value, protection agent 116 performs the data protection action on the respective program file before performing the data protection action on the different program file. In some aspects, there may be a plurality of program files that require data protection actions. However, some program files may be used more often than others, may be associated with user files that are more often accessed, may be associated with user files that are marked as "important" by the user, etc. Based on these factors, protection agent 116 may rank the program files by priority level and perform data protection actions in order of the ranking.

Figure 2:
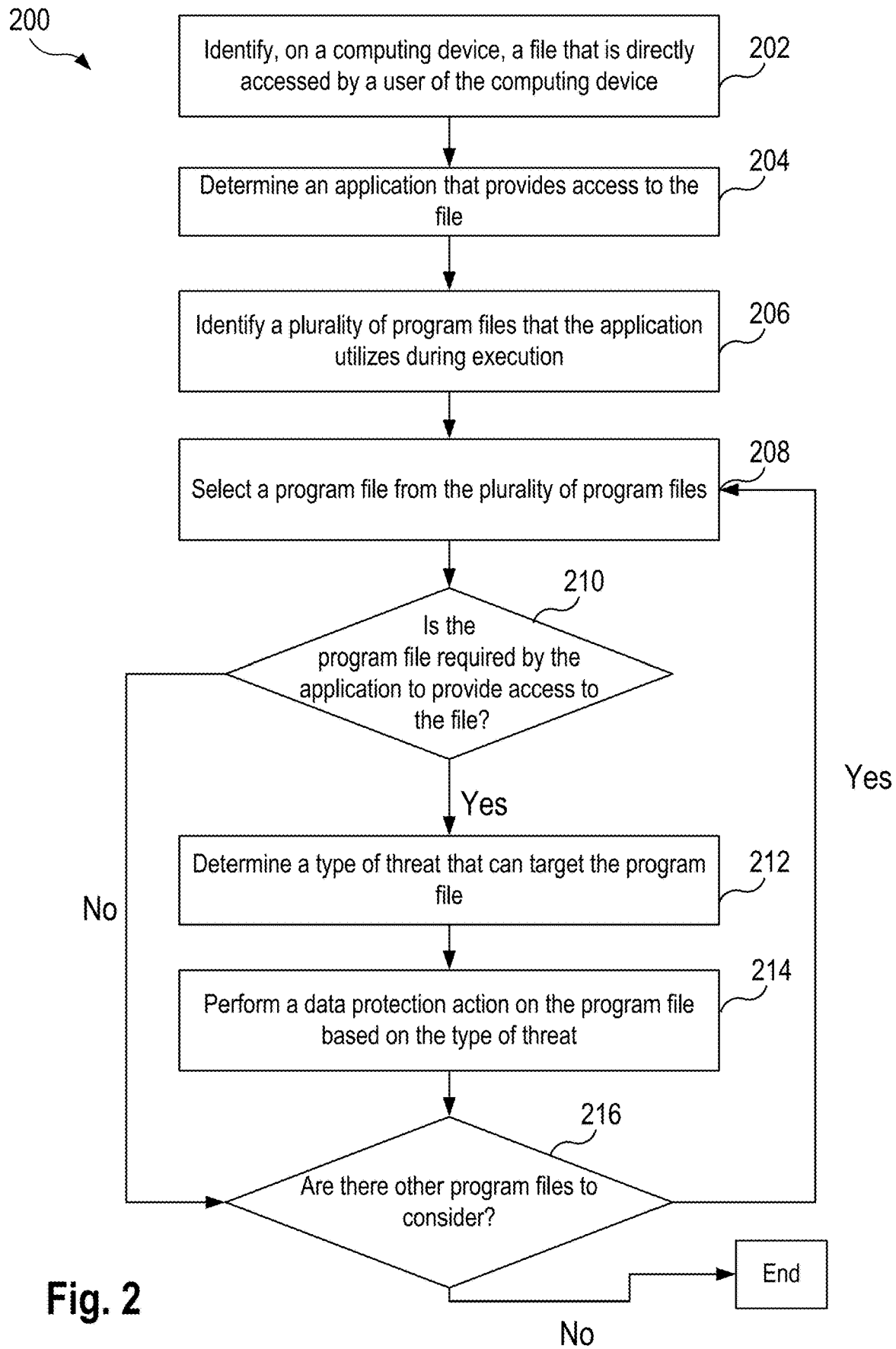
FIG. 2 is a flow diagram of a method for protecting files indirectly related to user activity, in accordance with aspects of the present disclosure.

FIG. 2 is a flow diagram of method 200 for protecting files indirectly related to user activity, in accordance with aspects of the present disclosure. At 202, file analyzing module 112 identifies, on a computing device, a file that is directly accessed by a user of the computing device. For example, module 112 may track file access statistics at the computing device during a period of time. The tracking enables module 112 to determine which files on the computing device are created, modified, accessed, downloaded, etc., via a direct command given by the user. Suppose that the user frequently accesses emails on his/her laptop.

At 204, file analyzing module 112 determines an application that provides access to the file. Historically, the user may access the emails via a client application such as Microsoft Outlook by selecting emails to read. Accordingly, module 112 determines that Microsoft Outlook is the application.

At 206, file analyzing module 112 identifies a plurality of program files that the application utilizes during execution. For example, Microsoft Outlook may load plugins, access credentials, text editing files, etc. At 208, file analyzing module 112 selects a program file from the plurality of program files. At 210, file analyzing module 112 determines whether the selected program file is required by the application to provide access to the file. For example, the selected program file may be an offline storage table file (e.g., an OST file) that stores emails, contacts, calendars, tasks, notes, etc. In order to access a particular email via Microsoft Outlook, the OST file may be needed because the email may be included in the OST file. Although the user directly accesses a ".msg" file, the OST file is indirectly accessed to actually generate the email for display.

In response to determining that the selected program file is required, method 200 proceeds to 212, where protection monitor 118 determines a type of threat that can target the program file. In this case, the OST file may not be prone to being deleted. Instead, because of the confidential nature of emails, there is a greater chance of the OST file being accessed by an unauthorized entity (e.g., a hacker).

At 214, protection agent 116 performs a data protection action on the program file based on the type of threat. For example, protection agent 116 may encrypt the OST file to prevent any unauthorized access to a user's emails.

At 216, file analyzing module 112 determines whether there are additional program files to consider. In response to determining that there are, method 200 returns to 208, where file analyzing module 112 selects a different program file. For example, the different program file may be a registry key of account settings that store the passwords of email accounts. The loop between 208 and 216 continues until all program files have been considered and a data protection action has been performed based on the types of threats the program files face.

Figure 3:
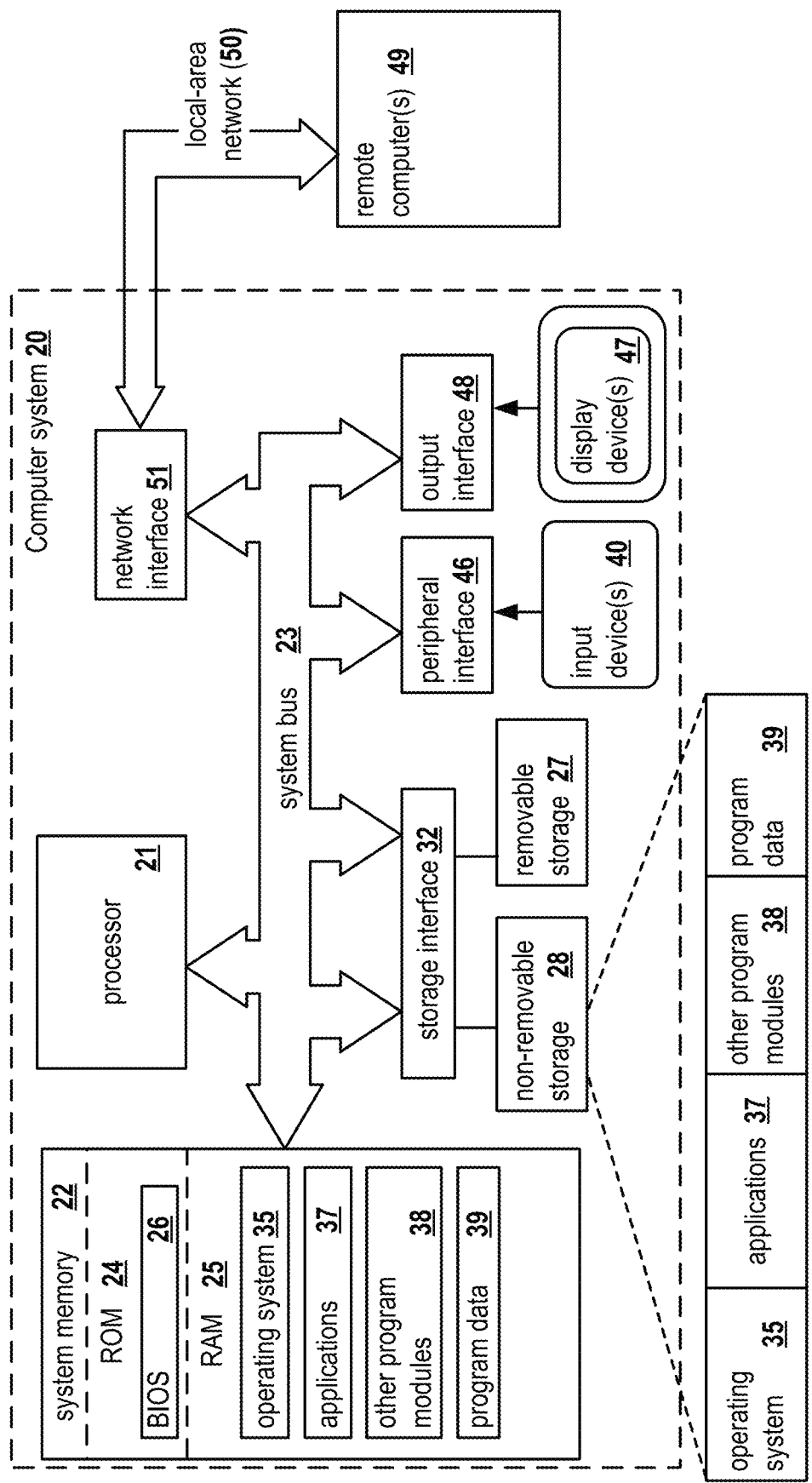
FIG. 3 presents an example of a general-purpose computer system on which aspects of the present disclosure can be implemented.

FIG. 3 is a block diagram illustrating a computer system 20 on which aspects of systems and methods for protecting files indirectly related to user activity may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-2 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for protecting files indirectly related to user activity, the method comprising:
identifying, on a computing device, a file that is directly accessed by a user of the computing device;
determining an application that provides access to the file;
identifying a plurality of program files that the application utilizes during execution;
for each respective program file of the plurality of program files:
determining whether the respective program file is required by the application to provide access to the file, wherein determining that the respective program file is required at least comprises determining that the respective program file is generated temporarily while the file is accessed and is deleted when the file is no longer being accessed;
in response to determining that the respective program file is required,
determining a type of threat that can target the respective program file; and
performing a data protection action on the respective program file based on the type of threat.

2. The method of claim 1, wherein determining that the respective program file is required further comprises determining that removing the respective program file prevents the application from providing access to the file.

3. The method of claim 1, wherein determining that the respective program file is required further comprises receiving an indication that the respective program file is required from a server that is configured to collect usage information of the application from a plurality of computing devices, wherein the indication is based on a subset of the usage information associated with a group of users with user profiles that correspond to a user profile of the user.

4. The method of claim 1, wherein determining that the respective program file is required further comprises receiving an indication that the respective program file is required from a machine learning algorithm trained to analyze the plurality of program files and identify program files required for accessing the file.

5. The method of claim 1, further comprising:
determining a likelihood of the respective program file being targeted by the type of threat; and
in response to determining that the likelihood is greater than a threshold value, prioritizing the respective program file for the data protection action.

6. The method of claim 5, wherein prioritizing the respective program file comprises:
  identifying a different program file that is required by the application to provide access to the file;
  determining another likelihood of the different program file being targeted by the type of threat; and
  in response to determining that the another likelihood is less than the threshold value, performing the data protection action on the respective program file before performing the data protection action on the different program file.

7. The method of claim 1, wherein determining the application comprises:
  identifying a plurality of candidate applications that can potentially provide access to the file;
  determining a respective plurality of extensions that are compatible with each candidate application of the plurality of candidate applications; and
  in response to determining that an extension of the file matches a respective extension of the respective plurality of extensions for a respective candidate application, identifying the respective candidate application as the application that provides access to the file.

8. The method of claim 7, wherein identifying the plurality of candidate applications comprises:
  determining a content type of the file; and
  identifying the plurality of candidate applications in response to determining that each respective candidate application of the plurality of candidate applications is associated with the content type of the file.

9. A system for protecting files indirectly related to user activity, the system comprising:
  a hardware processor configured to:
    identify, on a computing device, a file that is directly accessed by a user of the computing device;
    determine an application that provides access to the file;
    identify a plurality of program files that the application utilizes during execution;
    for each respective program file of the plurality of program files:
      determine whether the respective program file is required by the application to provide access to the file, wherein determining that the respective program file is required at least comprises determining that the respective program file is generated temporarily while the file is accessed and is deleted when the file is no longer being accessed;
      in response to determining that the respective program file is required, determine a type of threat that can target the respective program file; and
      perform a data protection action on the respective program file based on the type of threat.

10. The system of claim 9, wherein the hardware processor is configured to determine that the respective program file is required further by determining that removing the respective program file prevents the application from providing access to the file.

11. The system of claim 9, wherein the hardware processor is configured to determine that the respective program file is required further by receiving an indication that the respective program file is required from a server that is configured to collect usage information of the application from a plurality of computing devices, wherein the indication is based on a subset of the usage information associated with a group of users with user profiles that correspond to a user profile of the user.

12. The system of claim 9, wherein the hardware processor is configured to determine that the respective program file is required further by receiving an indication that the respective program file is required from a machine learning algorithm trained to analyze the plurality of program files and identify program files required for accessing the file.

13. The system of claim 9, wherein the hardware processor is further configured to:
  determine a likelihood of the respective program file being targeted by the type of threat; and
  in response to determining that the likelihood is greater than a threshold value, prioritize the respective program file for the data protection action.

14. The system of claim 13, wherein the hardware processor is configured to prioritize the respective program file by:
  identifying a different program file that is required by the application to provide access to the file;
  determining another likelihood of the different program file being targeted by the type of threat; and
  in response to determining that the another likelihood is less than the threshold value, performing the data protection action on the respective program file before performing the data protection action on the different program file.

15. The system of claim 9, wherein the hardware processor is configured to determine the application by:
  identifying a plurality of candidate applications that can potentially provide access to the file;
  determining a respective plurality of extensions that are compatible with each candidate application of the plurality of candidate applications; and
  in response to determining that an extension of the file matches a respective extension of the respective plurality of extensions for a respective candidate application, identifying the respective candidate application as the application that provides access to the file.

16. The system of claim 15, wherein the hardware processor is configured to identify the plurality of candidate applications by:
  determining a content type of the file; and
  identifying the plurality of candidate applications in response to determining that each respective candidate application of the plurality of candidate applications is associated with the content type of the file.

17. A non-transitory computer readable medium storing thereon computer executable instructions for protecting files indirectly related to user activity, including instructions for:
  identifying, on a computing device, a file that is directly accessed by a user of the computing device;
  determining an application that provides access to the file;
  identifying a plurality of program files that the application utilizes during execution;
  for each respective program file of the plurality of program files:
    determining whether the respective program file is required by the application to provide access to the file, wherein determining that the respective program file is required at least comprises determining that the respective program file is generated temporarily while the file is accessed and is deleted when the file is no longer being accessed;
    in response to determining that the respective program file is required, determining a type of threat that can target the respective program file; and
    performing a data protection action on the respective program file based on the type of threat.

18. The non-transitory computer readable medium of claim 17, further comprising instructions for:
- determining a likelihood of the respective program file being targeted by the type of threat; and
- in response to determining that the likelihood is greater than a threshold value, prioritizing the respective program file for the data protection action.

\* \* \* \* \*